United States Patent [19]

Finnan

[11] Patent Number: 4,504,499
[45] Date of Patent: Mar. 12, 1985

[54] HEAT-STABILIZED, CAROTENOID-COLORED EDIBLE OILS

[75] Inventor: Jeffrey L. Finnan, Southgate, Mich.

[73] Assignee: BASF Wyandotte Corporation, Wyandotte, Mich.

[21] Appl. No.: 488,160

[22] Filed: Apr. 25, 1983

[51] Int. Cl.³ .................... A23L 1/275; A23L 1/101
[52] U.S. Cl. .................... 426/250; 426/547; 426/601; 426/438; 426/523
[58] Field of Search ............... 426/250, 540, 438, 546, 426/523, 547, 601

[56] References Cited

U.S. PATENT DOCUMENTS

| | | | |
|---|---|---|---|
| 2,397,976 | 4/1946 | O'Leary | 426/547 |
| 2,563,835 | 8/1951 | Gribbins et al. | 426/546 |
| 2,861,891 | 11/1958 | Bauernfeind et al. | 426/540 |
| 3,039,877 | 6/1962 | Borenstein | 426/540 X |
| 3,906,112 | 9/1975 | Anderson | 426/250 X |
| 4,316,917 | 2/1982 | Antoshkiw et al. | 426/250 |
| 4,363,823 | 12/1982 | Kimura et al. | 426/547 X |

OTHER PUBLICATIONS

Swern, D., Bailey's Industrial Oil and Fat Products, vol. 1, Fourth Ed., John Wiley & Sons, N.Y. 1979, pp. 74, 75, 80 and 81.

*Primary Examiner*—Robert Yoncoskie
*Attorney, Agent, or Firm*—David L. Hedden; Joseph D. Michaels

[57] ABSTRACT

Stabilization of carotenoid-containing edible oils at elevated temperatures is accomplished by the use of stabilizing amounts of lauryl thiodipropionate, dilauryl thiodipropionate, a tocopherol and mixtures thereof. The stabilized colored edible oils retain a large percentage of the coloration subsequent to heating at deep-fat frying temperatures as compared with the coloration of said edible oil prior to heating.

3 Claims, No Drawings

HEAT-STABILIZED, CAROTENOID-COLORED EDIBLE OILS

BACKGROUND OF THE INVENTION

1. Field of the Invention

This invention relates to the heat stabilization of carotenoid-colored edible oils.

2. Description of the Prior Art

Borenstein in U.S. Pat. No. 3,039,877 discloses stabilized carotenoid compositions wherein the carotene stabilizer is selected from the group consisting of at least one of butylated hydroxyanisole, alpha-propyl gallate, nordihydroguaiaretic acid and butylated hydroxytoluene. In column 2 thereof, Borenstein teach away from the use of lauryl thiodipropinate as a stabilizer for carotene at elevated temperatures of 325° F. or above.

In U.S. Pat. No. 3,585,223, Hitoshi et al teach the use of cystine to stabilize animal or vegetable origin fats against oxidation. Fat-soluble vitamins, such as beta-carotene, vitamin A and vitamin E are included within the fats with which cystine acts as a stabilizer against oxidation.

In U.S. Pat. No. 4,169,901 to Kravis, deep-fat frying compositions are disclosed containing antioxidants such as butylated hydroxytoluene, butylated hydroxyanisole and citric acid.

Carotenoid, particularly carotene, compositions are useful as food coloring additives, particularly when the compositions are not subjected to high temperatures. In high temperature applications, appreciable decomposition of the carotenoid is found to occur starting at temperatures of from about 250° F. to about 375° F. The oxidation stabilizers that have been used in the past in cartenoid-containing compositions have not been entirely satisfactory in preventing severe bleaching of the color imparted by the carotenoid as a result of oxidation.

SUMMARY OF THE INVENTION

The present invention relates to carotenoid-containing compositions which are stable at temperatures of 250° F. and above and a process for preparing deep-fat fried foods such as popped corn and potato chips.

DETAILED DESCRIPTION OF THE INVENTION

The carotenoids which can be used in the practice of this invention are the known natural or synthetic available representatives of this class of compounds useful as coloring agents, e.g. carotene, lycopene, bixin, zeaxanthin, cryptoxanthin, butein, canthaxanthin, $\beta$-apo-8'-carotenal, $\beta$-apo-12'-carotenal, $\beta$-apo-8'-carotenoic acid, and esters of hydroxy- or carboxy-containing members of this group, such as lower alkyl esters and, preferably, methyl and ethyl esters. The above carotenoids can be employed singly or in admixtures, depending on the color desired. Especially preferred are carotenes and canthaxanthin which either can be obtained from natural sources or prepared synthetically.

Edible oils colored utilizing carotenes or other carotenoids can be stabilized against oxidation at elevated temperatures and bleaching out of the yellow color imparted by said carotenes by incorporating oxidation stabilizers selected from the group consisting of lauryl thiodipropionate, dilauryl thiodipropionate, tocopherol and mixtures thereof. Since carotene-containing edible oils are especially subject to oxidation at temperatures of 250° F. and above with attendant bleaching of the yellow color imparted by the carotene, the use of antioxidants at these temperatures is necessary to preserve the effectiveness of the carotene as a colorant for foods which are cooked utilizing a deep-fat frying process. Yellow colored popped corn and potato chips are examples of foods prepared by subjecting the food to heat in the presence of a carotene and an edible oil. The desirable yellow color imparted by the carotene contained in the edible oil is obtained at elevated temperatures where the carotene is suitably stabilized against oxidation in accordance with the process of this invention.

The carotenes useful as yellow colorants for edible oils can be derived from corn oil or other natural product or produced synthetically. Useful carotenes include the alpha-, beta- and gamma-carotenes. These are often called pro-vitamin A since the carotenes are converted in the human body to vitamin A by splitting the carotene molecule. As is well known, the carotenes are yellow to red pigments occurring in all green tissues of plants as well as in many species of fungi, bacteria and algae. The carotenes are characterized by a long chain polyene chain composed of recurring 2-methyl-2-butene units (isoprene units) linearly joined to each other in a head-to-tail fashion by double bonds. The center of the molecule always consists of two such units joined "tail-to-tail." Beta-carotene is the most active pro-vitamin A and consists of two vitamin A moities symetrically linked at their terminal side-chain carbons. Beta-carotene is also the most economically important pro-vitamin A. It has been found in the leaves of all plant species. The all-trans isomer is a dark-red crystalline solid which is soluble in the usual fat solvents. Beta-carotene can be synthesized starting with vitamin A. Alfalfa, carrots and palm oils have been a prime source of natural pro-vitamin A. Because the commercial beta-carotene is so easily subject to oxidation even at room temperatures upon exposure to air, it is usually sold mixed with corn or peanut oil to protect the carotene from oxidation. The beta-carotene activity of this mixture can vary from 10 to 35 percent by weight.

Unesterified tocopherols have been used as antioxidants to some extent by food technologists and by pharmaceutical formulators. Although sometimes not the best antioxidant per se, alpha-tocopherol is uniquely suited as an antioxidant for use in foods since it is absorbed and deposited in body tissues whereas other antioxidants are destroyed or excreted. The alpha-tocopherol has the greatest biological activity while the isomers beta-, gamma- and delta-tocopherol have a lesser activity. All forms of the unesterified tocopherol are useful as antioxidants in the process and compositions of the invention.

Common vegetable and land animal fats and oils comprise the edible oils useful in the deep-fat frying of foods. Any of the common edible oils can be utilized in admixture with a carotene as a yellow coloration agent for the foods deep-fried in said edible oils. Useful edible oils include almond oil, apricot kernel oil, babassu, castor oil, coconut oil or palm oil, corn oil, cotton seed oil, olive oil, palm kernel oil, peanut oil, grape seed oil, rice bran oil, safflower oil, sesame oil, soybean oil, sunflower seed oil, wheat germ oil, tallow, sorghum and coco butter. Among the preferred edible oils for use in the compositions and process of the invention are palm oil, corn oil, coconut oil, peanut oil, soybean oil, cotton seed oil, safflower oil and sunflower seed oil.

When it is desired to impart a yellow color to foods which are deep-fat fried in edible oil, a carotenoid such as carotene can be added to the edible oil and the food cooked at temperatures of about 250° F. to about 550° F. For instance, corn kernels can be popped utilizing a wet process in which the edible oil, popcorn kernels, carotene and stabilizer or stabilizers according to this invention are placed in any one of the known devices for preparing popped corn by the wet method. The mixture is heated to a temperature of about 400° F. to about 550° F. whereupon the kernels of popcorn explode to give the finished yellow popped corn. A similar procedure is utilized to prepare potato chips.

Lauryl thiodipropionate and dilauryl thiodipropionate are commercially available antioxidant compounds which are generally recognized as safe within certain limits for inclusion in products for human consumption. These antioxidants and the unesterified tocopherols, either used alone or in admixture, are the useful antioxidants of this invention for use with carotenoids. The oxidation stabilizer for the carotene, whether one or a mixture of stabilizers is used, should be present in the amount of about 0.005 percent by weight to about 0.05 percent by weight of stabilizer based upon the weight of the edible oil in which it is incorporated. Present limitations set by the United States Food and Drug Administration allow a maximum of 0.02 percent total antioxidant where the thiodipropionates are used alone or in combination with other antioxidants. Preferably about 0.015 percent to about 0.35 percent, and most preferably about 0.025 percent to about 0.03 percent, all by weight of oxidation stabilizer is used. The carotene coloring agent can be present in the edible oil in an amount of about 0.01 percent by weight to about 0.5 percent by weight based upon the weight of the edible oil. Preferably about 0.05 percent to about 0.35 percent, and most preferably about 0.10 percent to about 0.30 percent, all by weight of carotene is used. The edible oil can be palm oil which contains carotene. Ordinarily the carotene is added to the edible oil from a concentrate containing about 10 to 35 percent of synthetic beta-carotene in corn oil.

A metal chelator such as citric acid or any suitable material can be incorporated in a metal chelating amount into the carotenoid-containing edible oils stabilized with the antioxidants of the invention. It is well known that heavy metals such as iron act as pro-oxidants toward carotene. These heavy metals can be present in the equipment used to prepare the deep-fried foods as rust or in some other manner. The use of citric acid as a metal chelator is well known in the art.

It is desirable to incorporate the antioxidants of the invention in a concentrate comprising an edible oil and a carotenoid, i.e., carotene. The concentrate can be a solid, liquid, or a paste. Citric acid or other metal chelator also can be added to the concentrate. Such concentrates are prepared, for instance, by adding a metal chelating compound generally in an amount of about 0.5 percent to about 5.0 percent, preferably about 1.5 percent to about 4 percent, and most preferably about 2.5 percent to about 3 percent, all by weight based upon the weight of the concentrate. The antioxidant compositions of the invention are added to a suspension of a carotenoid such as crystalline carotene in an edible oil such as soybean, corn or peanut oil. Generally, the proportion of carotenoid such as carotene present in said edible oil is about 1 percent to about 50 percent, preferably about 5 percent to about 30 percent, and most preferably about 10 percent to about 25 percent, all by weight based upon the weight of the concentrate. The proportion of stabilizer present in said concentrate is generally about 0.09 percent to about 4.50 percent, preferably about 0.90 percent to about 4.0 percent, most preferably about 1.5 percent to about 3.5 percent, all by weight based upon the weight of the concentrate. The suspension is heated to 60° C. for one hour with mixing to dissolve the antioxidants. After cooling, an amount of the carotene suspension is added to any suitable edible oil such as corn oil so as to provide a 0.1 to 0.5 percent by weight solution of carotene in said oil.

In order to evaluate the stabilizing effect against oxidation of an antioxidants of the invention for one embodiment of the invention, i.e. carotene-colored edible oils, solutions of various mixtures of dilauryl thiodipropionate and tocopherol were prepared, as indicated in the following examples, and the percent decrease in coloration noted after heating the carotene-colored oil in combination with the antioxidants at a temperature of 126° C. for 16 hours. The purity with respect to the carotene content of the oil was evaluated by determining the tristimulus values of a mixture of 0.1 gram of each edible oil solution in 100 ml of isoctane. The tristimulus values were determined by the ANSI/ASTM Method E-308. The tristimulus values were converted to dominant wave length (hue) and the percent purity (saturation) of that dominant wave length. The percent decrease in purity was calculated.

The following examples illustrate the various aspects of the invention but are not intended to limit its scope. Where not otherwise specified throughout this specification and claims, temperatures are given in degrees centigrade and parts, percentages and proportions are by weight.

EXAMPLE 1

(Control, forming no part of this invention)

A 30 percent by weight suspension of crystalline beta-carotene in soybean oil was diluted with corn oil to obtain a 0.33 percent by weight mixture of beta-carotene. The mixture was heated at a temperature of 126° C. in the open air with light excluded for a period of 16 hours. Thereafter, 0.1 gram of this solution was dissolved in 100 ml of isooctane and the percent purity of the composition with respect to beta-carotene was determined in accordance with the previously described method. Test results are shown in the Table below.

EXAMPLES 2-7

Various antioxidant materials of the invention were added to a 30 percent by weight suspension of crystalline beta-carotene in soybean oil under an inert atmosphere. The suspension was heated to 60° C. for one hour while mixing to dissolve the antioxidant. The suspension was cooled and an amount of this beta-carotene suspension was added to corn oil so as to obtain a 0.33 percent by weight mixture of beta-carotene in the corn oil. Thereafter, the mixture of antioxidants and crystalline beta-carotene in corn oil was heated at a temperature of 126° C. in the open air with light excluded for a period of 16 hours. The purity with respect to beta-carotene was determined in accordance with the procedure described above. The proportions of antioxidants in the beta-carotene solution and the percent purity with respect to beta-carotene before and after heating are shown in the following Table.

TABLE

Stabilization of 0.33 Percent by Weight Solution of Beta-Carotene in Corn Oil

| Example | Antioxidant (% wt.) DLTDP* | Antioxidant (% wt.) α-Tocopherol | Percent Purity at Dominant Wavelength+ Before Heating | Percent Purity at Dominant Wavelength+ After Heating @ 126° C. | Percent Decrease in Purity |
|---|---|---|---|---|---|
| 1 (control) | — | — | 60.4 | 27.2 | 50.9 |
| 2 | 0.023 | 0.023 | 61.7 | 42.7 | 30.8 |
| 3 (Control) | — | 0.058 | 62.6 | 38.9 | 37.8 |
| 4 (Control) | 0.058 | — | 62.1 | 37.1 | 40.2 |
| 5 | 0.046 | 0.012 | 61.9 | 43.9 | 29.0 |
| 6 | 0.040 | 0.018 | 62.3 | 42.4 | 31.9 |
| 7 | 0.053 | 0.005 | 62.0 | 41.7 | 32.8 |

*Dilauryl thiodipropionate
+572 nanometers

While this invention has been described with reference to certain specific embodiments, it will be recognized by those skilled in the art that many variations are possible without departing from the scope and spirit of the invention and it will be understood that it is intended to cover all changes and modifications of the invention disclosed herein for the purposes of illustration which do not constitute departure from the spirit and scope of the invention.

The embodiments of the invention in which an exclusive property or privilege is claimed are defined as follows:

1. A process for preparing colored fried foods comprising the step of heating said food at temperatures sufficient to cook said food in the presence of an edible oil, a colorizing amount of a carotenoid, and an oxidation stabilizing amount of a stabilizer which is a mixture of lauryl thiodipropionate or dilauryl thiodipropionate in combination with an effective amount of a tocopherol.

2. The process of claim 1 wherein said edible oil contains a carotene in the amount of from about 0.01 percent by weight to about 0.5 percent by weight based upon the weight of said edible oil and said stabilizer is present in an amount of from about 0.005 percent to about 0.06 percent, all based upon the weight of said edible oil.

3. The process of claim 2 wherein said edible oil is selected from the group consisting of peanut oil, cotton seed oil, safflower oil, sunflower seed oil, palm oil, soybean oil, corn oil, cocoanut oil and mixtures thereof.

* * * * *